United States Patent [19]

Masters

[11] Patent Number: 4,483,317
[45] Date of Patent: Nov. 20, 1984

[54] AMBIENT STEAM CAPTURING DEVICE

[76] Inventor: Pamela Masters, 2934 Mosquito Rd., Placerville, Calif. 95667

[21] Appl. No.: 352,935

[22] Filed: Feb. 26, 1982

[51] Int. Cl.³ .................................................. A47J 27/00
[52] U.S. Cl. ...................................... 126/390; 126/373; D7/22; D7/327
[58] Field of Search ................ 126/390, 376, 373; 220/4 C, 4 D, 408, 410; D7/357, 16, 22, 327, 354, 356, 130, 131; 99/426, 645, 646 C

[56] References Cited

U.S. PATENT DOCUMENTS

| D. 49,708 | 9/1916 | Lamb | D7/354 |
|---|---|---|---|
| D. 257,713 | 12/1980 | Korach | D7/22 X |
| 173,697 | 2/1876 | Walker | 126/377 |
| 2,575,770 | 11/1951 | Roop | 220/410 X |
| 3,051,303 | 8/1962 | Daanen et al. | D7/22 X |
| 3,815,736 | 6/1974 | Sedlak | D7/40 X |
| 3,955,710 | 5/1976 | Commisso | D7/40 X |
| 4,204,609 | 5/1980 | Kuhn | 220/408 |

FOREIGN PATENT DOCUMENTS

| 857134 | 10/1952 | Fed. Rep. of Germany | D7/354 |
|---|---|---|---|
| 34412 | 3/1911 | Sweden | 126/373 |

*Primary Examiner*—Randall L. Green
*Attorney, Agent, or Firm*—Leonard Bloom

[57] ABSTRACT

A plurality of food serving dishes constructed from a high temperature ceramic material and dimensioned so that when inverted they can engage the rim of the standard size sauce pan and substitute as a lid or cover for those sauce pans so that the heat dissipated in the form of steam during the cooking process can be employed to preheat the serving dishes which when reinverted contain and keep warm foodstuffs when employed in conjunction with the accompanying lids.

1 Claim, 6 Drawing Figures

U.S. Patent     Nov. 20, 1984     4,483,317
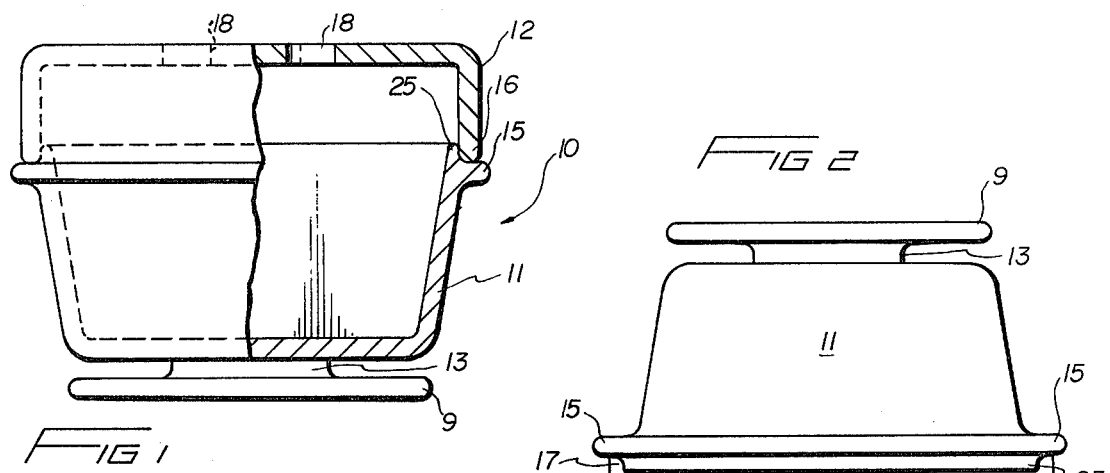
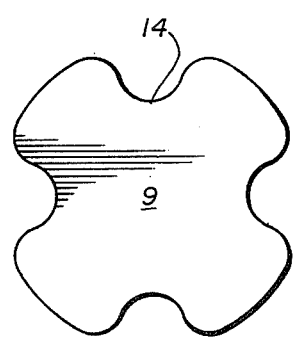
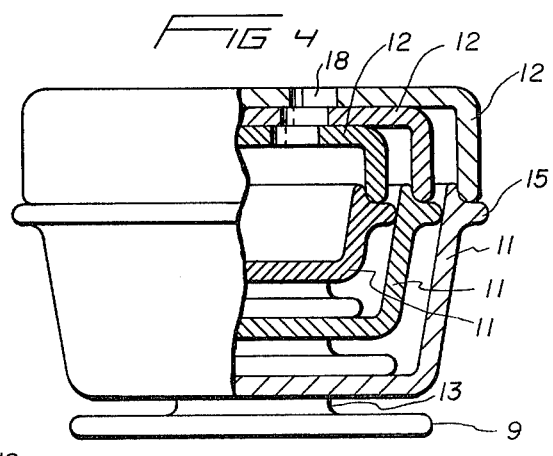
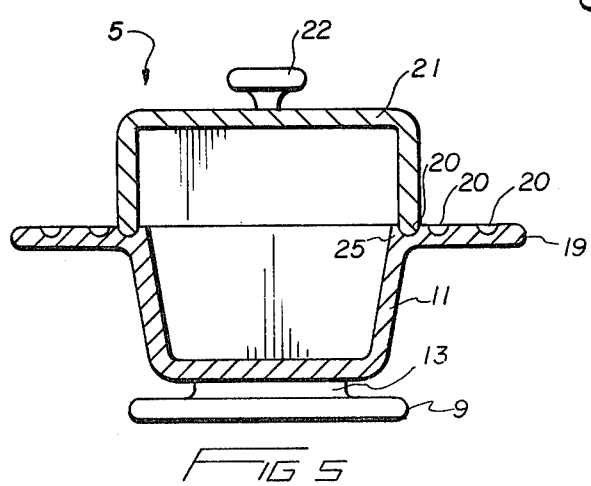
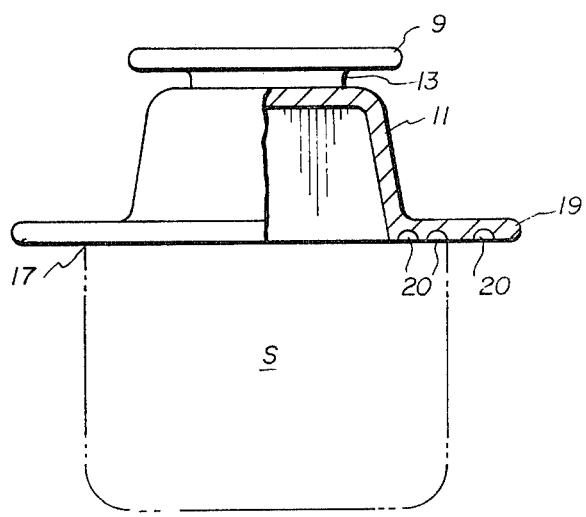

AMBIENT STEAM CAPTURING DEVICE

BACKGROUND OF THE INVENTION

The present invention relates generally to food service ware, and more specifically to serving containers for foodstuffs which retain heat so that prepared food remains at a desirable temperature.

During the preparation and serving of a meal, it often occurs that the various portions of a meal are not ready simultaneously and it becomes necessary to store one dish in a warmer or the like while another dish or portion finishes cooking. In fact, an important aspect of the culinary art is having everything cooked at the same time so that all portions of the meal are equally hot and appealing when served. Furthermore, once the meal has been served, any leftover portions quickly become tepid and if second portions are desired the food has become far less appealing because of its change in temperature.

In an institutional setting the problem is often amplified because of the necessity of transporting meals to various depots in order to distribute. The time lag between the end of preparation and the serving of the meal can be as much as thirty minutes. Obviously, if the meal is not kept warm during this period of time it becomes far less appealing. Furthermore, reheating meals only further dehydrates the foodstuffs making them less palatable.

The prior art is prolific in warming and heat storing devices to prevent the above-mention drawbacks. The following patents reflect the state of the art of which applicant is aware insofar as they appear germane to the patent process:

U.S. Pat. Nos. 2,771,754, Winkler; 3,065,744, Scavullo; 3,195,532, Tranberg; 4,246,884, Vandas; 4,258,695, McCarton et al.

Of the references cited the patents to Scavullo and McCarton et al. would appear to be of interest since they both teach the use of a meal warmer which has a heat retaining element disposed within a containment area whereby a temperate environment is maintained in the containment area. In both these devices it is necessary to heat the heat retaining elements separately before disposing the foodstuffs therein. Thus, a primary source of energy must be employed to prepare these devices for use.

The invention according to the instant application is distinguished in that the ambient steam produced during the cooking process is used to heat the device thereby saving energy. Thus, a unique process of cogeneration is employed such that the heat used to cook the meal is also used to preheat the serving containers from which the meal is served.

The remaining references show the state of the art further.

The instant invention is distinguished from these references in that its structure and configuration present novel synergistic aspects which are non-obvious and not taught by prior art devices.

OBJECTS AND SUMMARY OF THE INVENTION

Accordingly, it is a primary object of the present invention to provide a novel food serving and warming apparatus in which the serving dishes are substituted for cooking pan lids and preheated using the live, free steam from the cooking process thereby conserving energy.

Another object of the present invention is to provide a novel food serving and warming apparatus which when functioning as a lid to a cooking pot is shaped to permit it to seal and fit a plurality of cooking pot sizes.

It is still another object of the present invention to provide a novel food serving and warming apparatus in which a plurality of serving dishes fit or nest one inside the other to conserve space during storage.

It is a still further object of the present invention to provide a novel food serving and warming apparatus in which an instantaneous heat transfer occurs from the serving dishes to the food contained therein thus conserving energy and minimizing any lag time involved.

It is a further object of the present invention to provide a novel food serving and warming apparatus which is simple in construction, durable in use, easy to manufacture, and lends itself well to mass production techniques.

These and other objects are accomplished by the provision of a plurality of food serving dishes which when inverted over various size cooking pots act as a lid for the pot and become preheated by the free steam created during the cooking process. After the lids are heated, they are reinverted and act as serving dishes for the foodstuffs.

The objects stated above and other objects will become apparent when the ensuing specification is taken in conjunction with the appended drawing figures, wherein like numbers represent like parts.

BRIEF DESCRIPTION OF THE DRAWING FIGURES

FIG. 1 is a partial sectional side view of a serving dish with its associated cover.

FIG. 2 is a side view of just the serving dish inverted upon a sauce pan.

FIG. 3 is a bottom view of just the base of a serving dish showing the crenelations provided therein to assist in gripping the base when the dish is in the inverted position as in FIG. 2.

FIG. 4 is a partial sectional view of a plurality of serving dishes and their associated covers in the nested or storage position.

FIG. 5 shows an embodiment of the invention in which the serving dish has an extended lip or rim provided with a plurality of circumferential troughs designed to engage the rim of various size cooking pots.

FIG. 6 is a partial sectional view of the embodiment displayed in FIG. 5 as it would appear inverted upon the top of a sauce pan.

DESCRIPTION OF THE PREFERRED EMBODIMENT

Referring now to the drawings in detail wherein like reference numerals represent like parts throughout the several figures, reference numeral 10 refers generally to a first embodiment of the invention in which a substantially cylindrical dish 11 with a cover 12 provides a serving device for food.

The dish 11 is provided with a base 9 upon a pedestal 13 which insulates the base 9 from the dish 11. The base 9 is provided with preferably four crenelations 14 which define a cruxiform base to assit in grasping the base 9 of the dish 11 when it is deployed in its inverted position as shown in FIG. 2. The dish 11 is further provided with a horizontally disposed peripheral lip 15 at an upper extremity thereof which supports as a shelf and engages the lip 16 of the cover 12 as shown in FIG. 1.

Referring now to FIG. 2, when the dish 11 is inverted and placed over a sauce pan S the dish lip 15 along with an annular bead 25 engages the rim 17 of the sauce pan S. A plurality of similarly configured dishes 11 are provided and dimensioned to fit over and engage standard size sauce pans ranging in capacity from one to four quarts.

The cover 12 for the dish 11 is provided on a top face thereof with a pair of apertures 18 which function as finger holes to assist in removing the cover 12 from the dish 11.

As shown in FIG. 4, a series of serving dishes 11 can be nested one within the other for storage purposes. The smaller dimensioned dish readily fits within the containment area of each successively larger dimensioned dish.

FIGS. 5 and 6 represent another preferred embodiment of the invention generally referred to by reference numeral 5 in which the dish 11 with its associated pedestal 13 and base 9 are similar to the previous embodiment, however the peripheral lip 19 in this embodiment is an extended horizontal shelf type flange with three circumferential troughs 20 disposed on an upper face of the flange lip 19 which are radially dimensioned so as to engage the rims 17 of the various standard size sauce pans S. Thus, this single dish 11 because of its flanged lip 19 is able to engage three different size sauce pans S, whereas in the previous embodiment a separate dish 11 was dimensioned to engage a particular size sauce pan S. In this embodiment the cover 21 is provided with a knob 22 which functions as a handle for the cover 21.

As shown in FIG. 6, this embodiment of the invention is also inverted and placed on the top of a sauce pan S and because of circumferential troughs 20 it securely engages the rim 17 of the sauce pan S.

Both embodiments 5 and 10 of the invention are preferably constructed and formed from a heat retaining material such as high fired ceramic, or the like.

In use and operation, the various sizes and embodiments of the invention function similarly. The dish 11 becomes a substitute lid for the sauce pan S so that the free steam generated during the cooking process heats the material from which the dish 11 is constructed so that when it is reinverted and the cover 12 is replaced, the containment area within the dish 11 remains hot because of the heat which is slowly dissipated from the device 5, 10. Thus, the food remains hot and energy is conserved because the preheating process uses the steam produced in the cooking process which is normally simply dissipated into the air.

Having thus described the preferred embodiment of the invention, it should be understood that numerous structural modifications and adaptations may be resorted to without departing from the spirit of the invention.

What is claimed is:

1. A serving dish comprising in combination:
   a food receiving area defined by a bottom wall, a peripheral side wall extending from and circumscribing said bottom wall,
   a laterally extending peripheral lip integral with, emanating from and circumscribing an outer face of said peripheral sidewall, and spaced from a top edge thereof forming a support shoulder with said top edge which sealingly engages a rim of an associated pot used in cooking when said serving dish is inverted and covers the pot, whereby moisture escaping from the pot as steam heats said dish,
   a pedestal,
   a support base connected to an outer face of said bottom wall through said pedestal interposed therebetween and integrally formed therewith,
   said support base having substantially the same surface area as said bottom wall for stability, said pedestal necked down substantially less in horizontal section than said base, whereby heat migration from the steam to the base is retarded and said serving dish base exhibits a temperature difference relative to said food receiving area to allow said base to be placed directly on a table surface without heat damage to the table surface,
   and a shelf-type flange extending horizontally of said peripheral lip, said flange including an upper face having a plurality of radially-spaced circumferential troughs formed therein, whereby one said dish can accomodate a plurality of pots.

* * * * *